United States Patent [19]

Krivec

[11] 4,359,385
[45] Nov. 16, 1982

[54] FILTER PRESS PLATE TRANSFER MECHANISM

[75] Inventor: Bert Krivec, Waukesha, Wis.

[73] Assignee: Envirex Inc., Waukesha, Wis.

[21] Appl. No.: 280,746

[22] Filed: Jul. 6, 1981

[51] Int. Cl.³ .............................................. B01D 25/12
[52] U.S. Cl. ................................................... 210/230
[58] Field of Search ................ 100/199, 200; 210/224, 210/230, 231

[56] References Cited

U.S. PATENT DOCUMENTS

| | | | |
|---|---|---|---|
| 3,624,778 | 11/1971 | Weber | 100/199 |
| 3,915,863 | 10/1975 | Busse et al. | 210/230 |
| 4,184,960 | 1/1980 | Schotten | 210/230 |
| 4,246,117 | 1/1981 | Timmins et al. | 100/200 |
| 4,265,749 | 5/1981 | Busse et al. | 210/230 |
| 4,272,376 | 6/1981 | Schotten | 210/230 |
| 4,295,970 | 10/1981 | Oelbermann et al. | 210/230 |

Primary Examiner—Ivars C. Cintins

[57] ABSTRACT

The chain-carried pawls which are to shift the plates on the rails of a filter press in successive order are provided with roller weights which ride on upper and lower tracks and provide the improved shifting of the plates and support of the lower runs of the chains.

7 Claims, 10 Drawing Figures

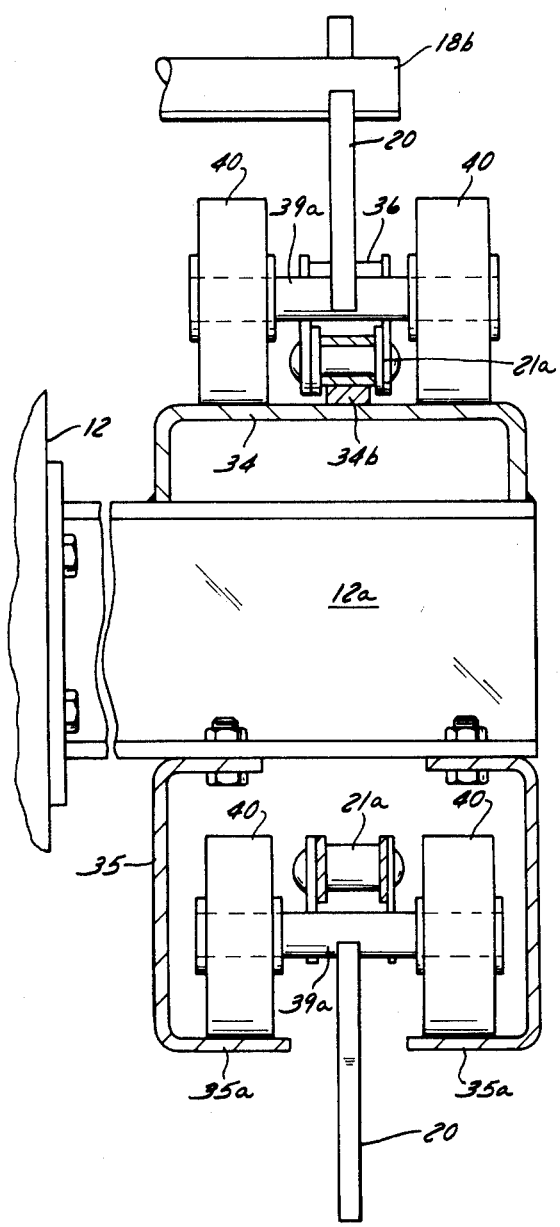
FIG. 9
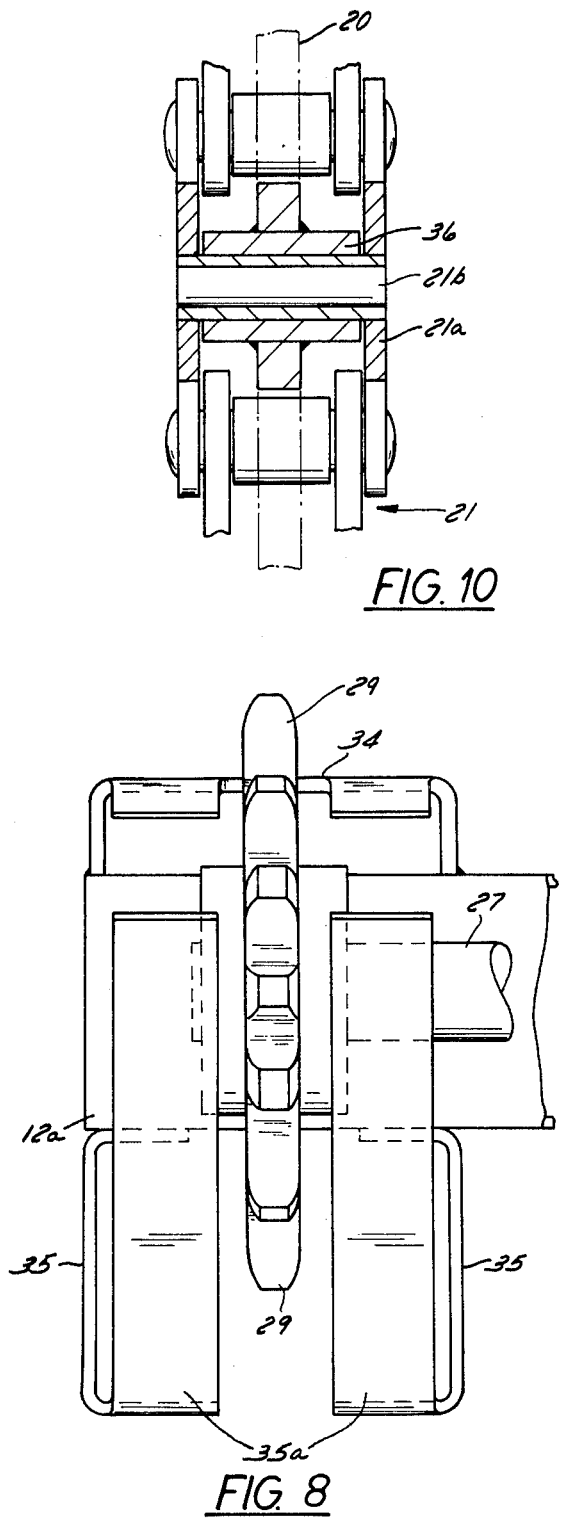
FIG. 10
FIG. 8

FILTER PRESS PLATE TRANSFER MECHANISM

BACKGROUND OF THE INVENTION:

In one type of filter press, filter cloths are held between a horizontally arranged series of plates. The plates have projecting support arms which are slideable on spaced, parallel support rails. Periodically the plates and filter cloths must be separated for cake removal and cleaning. Separating all of the plates for access to all at the same time is readily provided for but requires that the rails and the machine be of considerable length. Shifting only one or several plates in successive order allows the machine instead to be shorter overall, but requires a dependable mechanism for that purpose.

Most such mechanisms of the prior art are of considerable complexity. The present invention is an improvement over one of the less complex prior art mechanisms which will be described in connection with a filter press of improved design and which includes filter plates and intermediate diaphragm plates. Typically, such a press may include up to one hundred and fifty such plates which require shifting.

The frame of the typical, horizontal filter press includes two, parallel support rails which connect the fixed head at one end of the machine and a hydraulic ram at the other end. The moveable head is moved by the ram toward or away from the fixed head as required and is supported for such movement by and between the two rails. The plates are slidably supported on and between the rails and are disposed between the two heads. Filter cloths are suspended between each two adjacent plates. In the filter press here being described, the first plate is disposed adjacent to the moveable head and the first, third, etc. including the last plate are filter plates. All of said filter plates except possibly the plate which is adjacent to the fixed head also include oppositely projecting pins, the pins of each plate projecting respectively from the two vertical sides of the plate and over the two rails. The other, that is, the second, fourth, etc. including the second-last plate are diaphragm plates. They are connected respectively to the first, third, etc. filter plates by flexible cables of fixed identical lengths or other suitable means as will appear.

The prior art shifting mechanism includes an endless chain alongside each rail and operating over a drive sprocket at the ram end and a driven sprocket at the fixed head end of the machine. The two drive sprockets are mounted on a shaft extending across the ram end of the machine and a shaft drive means causes the upper runs of the two chains to move toward said ram end of the machine. The critical elements of the mechanism include a pair of pawls which are pivotally connected respectively to two corresponding links of said chains. Each pawl extends forwardly of such link having reference to its direction of movement as effected by the drive means and extends upwardly of the upper run and downwardly of the lower run. That is, as to the lower run, the pawls hang from their chains.

A track between the sprockets at each side of the machine slidably supports the upper run of the respective chain a precise distance immediately and directly below the series of pins projecting from the plates such that in their upper engaging position, the two pawls of the two chains simultaneously engage respectively the projecting pins extending from the filter plate which is to be moved on the rails a distance toward the movable head. In their lower passing position, the two pawls pass under the pins of all the other filter plates so as not to move any which have already been or are subsequently to be shifted. Each pawl is biased upwardly by counterweights for that purpose and is provided with a forwardly projecting cam which engages or does not engage the pins to pivot the pawl downwardly or allow it to pivot upwardly as required. The cam engages and slides against the pins or support arms and is moved downwardly by the forward movement of the pawl such that the cam pivots the pawl downwardly. The proximal portion of the cam is straight and is extended to slide against the undersides of the pins and hold the pawl in its passing position.

The required form and length of the cam is determined by the spacing of the pins of the plates which are in the open position relative to the spacing of those which are in the closed position. This may be further and best explained by describing the opening and the closing cycles of the press.

For filtering, all the plates are under compression and are, of course, equally spaced. For cleaning, the feed is stopped and the movable head is retracted toward one end of the machine. The two chains are then driven to move the pawls beneath the projecting pins of the filter plates. All the pins are relatively close together so that they in cooperation with the cams hold the pawls in their passing positions until having passed the pins of the first filter plate to be moved. When the cams have passed the pins referred to and there being then no pins holding the pawls in their passing position, the pawls are biased upwardly to engage the pins of the first plate. Thereupon, the movement of the first plate away from the second is initiated and proceeds to the extent allowed by the pair of cables or other means connecting the two plates so as to maintain a limited spacing therebetween. The first and second plates then move together until the nose of each cam reaches a pin carried by the movable head.

As the two cams are depressed by the pins of the moveable head, the pawls are pivoted to their lower passing positions and the pawls disengage the pins of the first plate. The first plate is now again adjacent to the movable head and the first, second and third plates are suitably spaced for cake removal and the first cleaning cycle by other apparatus which need not be described here.

During the cleaning cycle the chains continue to operate so that two pawls are ready to engage the next plate. After the first cleaning cycle, the pair of pawls next engage the pins of the third plate. The movement of that plate then proceeds until it is spaced from the fourth plate and their connecting cables are then operative such that both plates are moved toward the ram end of the machine. At about the same time, the third plate engages the second plate which it also moves toward the first plate. When and as the two cams reach and are depressed by the pins of the first plate, the pawls are disengaged from the pins of the third plate so that the pawls pass under the latter pins and the pins of the movable head. Such disengagement now leaves the third, fourth and fifth plates suitably spaced for the cleaning cycle which proceeds while pawls are positioned to enggae the fifth plate of the machine. In the next sequence, the third, fourth and fifth plates are reclosed and the fifth, sixth and seventh plates are suitably spaced and so on. After the cleaning of the last three plates, the drive means is stopped. For resumption of the filtering operation, the ram pushes the movable head and the plates are all pushed together or regrouped.

Each two pawls are carried by the chains in precisely parallel paths. However, for example, if either pawl malfunctions, the plate which is being shifted by the other pawl will be skewed and require considerable repair.

It is the object of the present invention to provide pawls which operate smoothly and reliably and which readily engage and disengage the support arms of the plates.

It is another object to provide track means for the pawls so that they are well guided and retracted as they move around the sprockets.

It is another object to increase the life expectancy of such apparatus and to reduce operating noise and wear of the operating parts.

It is another object to provide an improved support of the return run of the chain so that although some slack in the chain may be allowed to develop, the engagement of the chain and drive sprocket is fully maintained in any case so that all of the foregoing advantages are realized.

SUMMARY OF THE INVENTION

The moving pawls of the plate shifting mechanism of a filter press include forwardly projecting cams which may engage pins carried by the plates. The force applied to the plate being shifted has an upward component. Each pawl is fitted with a pair of rollers which are supported on a track and carry the main downward reactive component. The rollers also uniquely support the return run of the chain and allow the chain to sag between each set of rollers to take up any slack in the chain.

DESCRIPTION OF THE SEVERAL VIEWS OF THE DRAWINGS

FIG. 8 is an end view of the sprocket and tracks shown in FIG. 7.

FIG. 9 is a vertical cross-section of the chain mechanism at a location intermediate its ends.

FIG. 10 is a further enlarged section taken on line 10—10 of FIG. 6 to indicate the pivotal support of the pawl.

Figure 1:
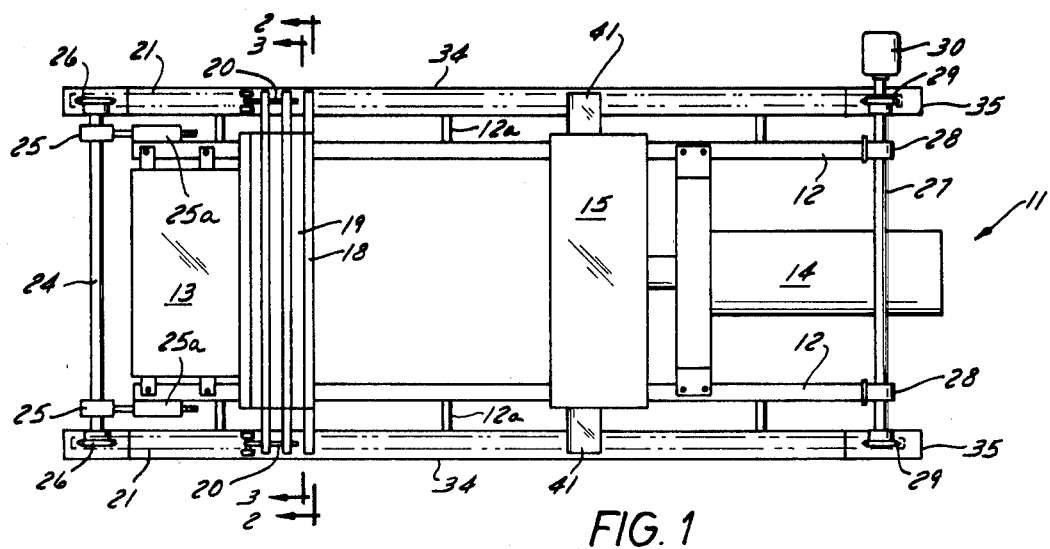
FIG. 1 is a plan view of the several main parts of the press. The movable head as shown is withdrawn for the start of the cleaning operation. Only seven filter plates are shown. (A typical press as shown would have 75 or more such plates. The cleaning apparatus which operates above the press is not shown in any of the Figures.)

DESCRIPTION OF THE PREFERRED EMBODIMENT SHOWN IN THE DRAWING:

The filter plate press 11 shown in FIG. 1 includes the spaced prallel rails 12 which connect the head 13 and the hydraulic cylinder or ram 14. Cylinder 14 moves the movable head 15 toward head 13 and therewith serves to hold the plates 18 and 19 firmly together in face-to-face engagement for the normal operation of the press.

The several plates of the particular press as shown include filter plates 18 and the intermediate diaphragm plates 19. Means for introducing the feed to the plates and the withdrawal of the filtrate are not shown.

Figure 2:
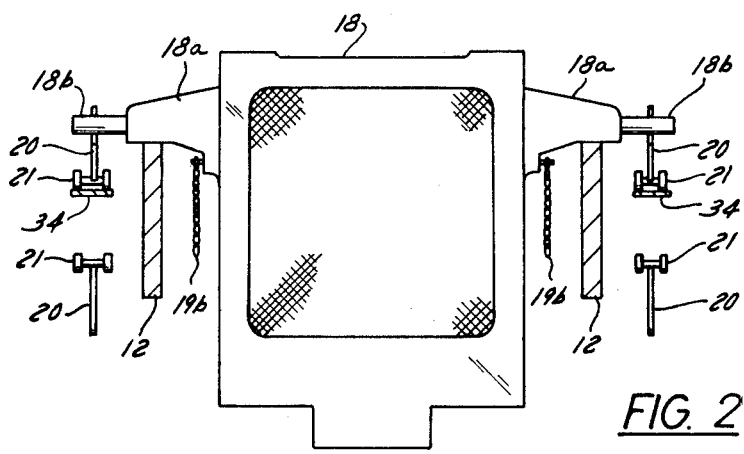
FIG. 2 is a section taken on line 2—2 of FIG. 1 and shows a filter plate supported on the two rails shown in section.
Figure 3:
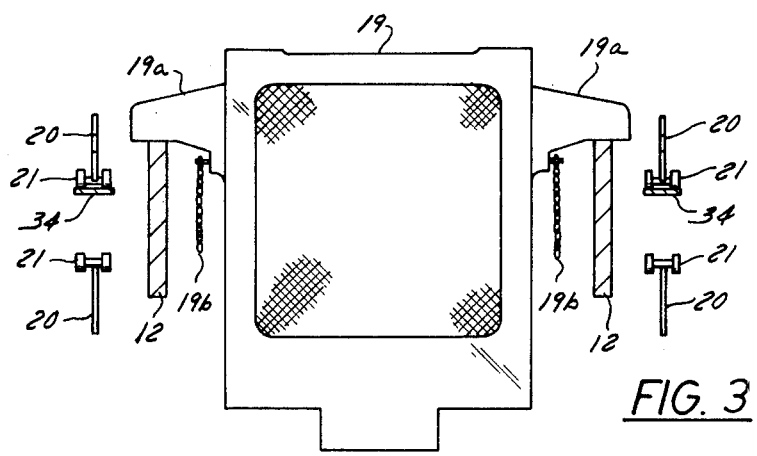
FIG. 3 is a section taken on line 3—3 of FIG. 1 and shows a diaphragm plate supported on the two rails shown in section.

Each filter plate 18 includes the oppositely projecting arms 18a as shown in FIG. 2. Arms 18a extend over and rest on the rails 12 for the slideable support of the plate between the rails. The pins 18b project from arms 18a for engagement by the shifting mechanism of the present invention as will be further described.

Each diaphragm plate 19 is of the same outer form as plate 18 and includes the projecting arms 19a which slideably support the plate on and between rails 12. A cable 19b of a certain length connects each diaphragm plate 19 with a filter plate 18 as will be further described.

After a period of operation of the press, the faces of the plates and the mentioned cloths require cleaning. Access to the cloths and the plate faces is provided by first causing the hydraulic cylinder 14 or other means to withdraw the movable head 15 from the series of plates 18 and 19. As is shown in FIG. 1, head 15 is moved a distance, which is approximately twice the length of each cable 19b to provide two openings between plates for the cleaning mechanism.

The mechanism of the present invention includes the sets of pawls 20 which are secured at corresponding intervals to the two parallel, endless chains 21. The shaft 24 extending across the end of the stationary head 13 is supported by the take-up bearings 25 having take-up means 25a and at each end is fitted with a driven sprocket 26. A drive shaft 27 supported in bearings 28 extends across the end of ram 14 and is fitted with the drive sprockets 29. The hydraulic motor and reducer 30 is suitably connected to one end of shaft 27 to operate the two chains 21 over the corresponding sprockets 26 and 29. An upper guide or track 34 at each side of the press supports the upper run of each chain 21 a precise distance below the pins 18b of plates 18. Spaced channels 35 form a lower track to support the lower run of each chain as will be described. Both tracks are, suitably supported such as by brackets 12a extending from rails 12.

Each chain 21 at intervals includes an attachment link 21a having a pin 21b on which a pawl 20 is pivotally supported. For that purpose, pawl 20 is secured to the bearing 36 which is turnable on pin 21b as sown in detail in FIG. 10. Each pawl 20 is critically dimensioned and includes a cam 37 which extends forwardly having reference to its movement by the chain, and also curves downwardly having reference to the pawls of the upper run of the chain. The upper edge of the pawl is recessed to form the detent 38 which is located upwardly and forwardly of bearing 36. The trailing arm 39 of pawl 20 carries the cross pin 39a on which the two wheels 40 are journalled. Wheels 40 together form a weight which more than offsets the weight of the cam 37 so that the cam an detent 38 are normally biased upwardly. In particular, wheels 40 and bearing 36 provide a three-point support for the pawl on track 34 when a pin 18b has been engaged in detent 38 and the pawl is pushing a plate 18.

Figure 4:
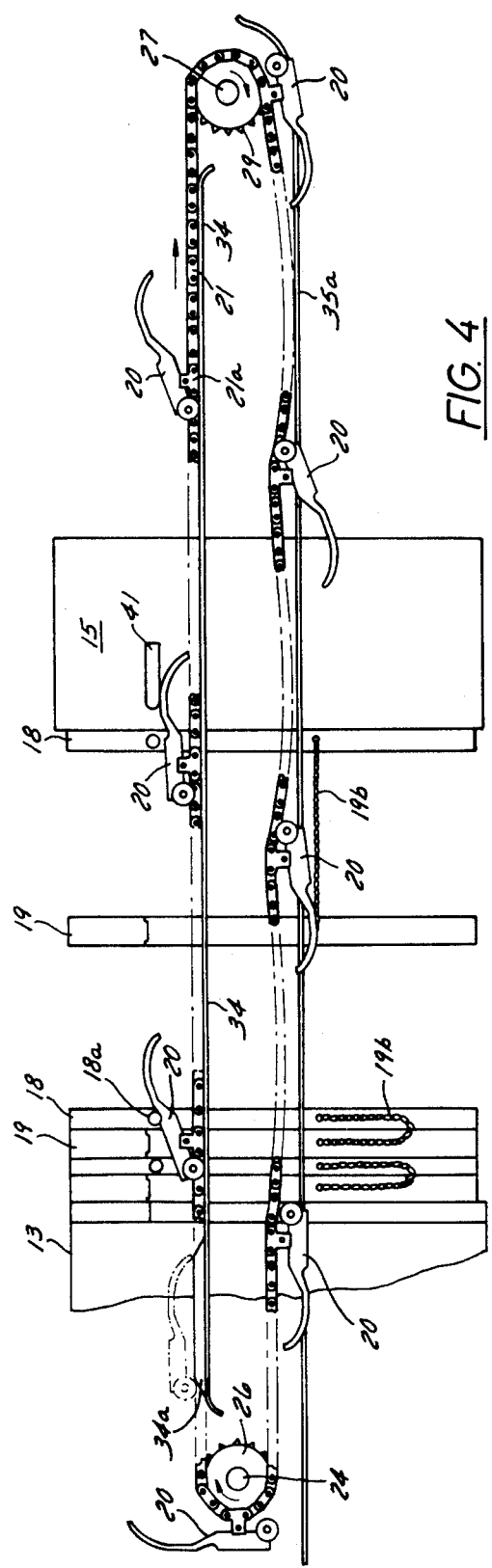
FIG. 4 is a side elevation of parts of the press shown in FIG. 1 and depicts both the upper and lower runs of the chain. For convenience, the cables which connect each two plates are shown in a lower position rather than between the plates and their supporting rails as in FIGS. 2 and 3.
Figure 5:
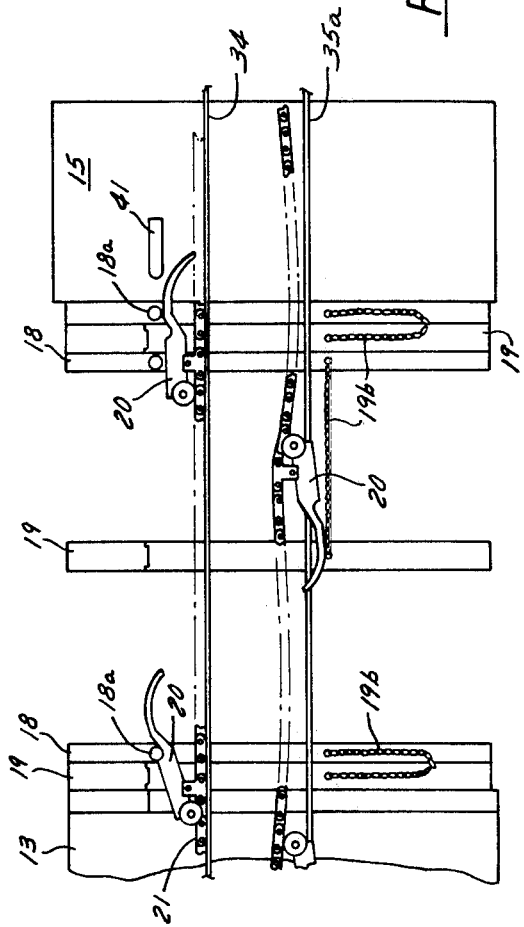
FIG. 5 is similar to that of FIG. 4 but does not include the ends of the chain. A set of pawls has moved the first two plates toward the movable head and separated the third, fourth, and fifth plates for the cleaning of their exposed plates.

The operation of pawls 20 in opening and closing plates 18 and 19 is shown in FIGS. 1, 4 and 5. It should be understood that two corresponding pawls 20 carried by chains 21 must engge the two pins 18b of each plate 18 at the same time to move the plate on rails 12. Similarly, the two pawls must also disengage the two pins 18b at the same time so that the plate is and remains properly positioned.

As shown in FIG. 1, the movable head 15 has been retracted to the right as shown to provide a space between head 15 and the first plate 18 of the series. The plates are still in place on rails 12 and the last of the series is adjacent to fixed head 13. The two pawls 20 are shown moving beneath the pins 18b of the series and will engage the pins 18b of the mentioned first plate and will move this plate so that it is adjacent to movable head 15 as shown in FIG. 4. Also, the cables 19b connecting the first and second plates as described (not shown in FIG. 1) will position the second plate approximately mid-way between the first and third plates as is shown in FIG. 4.

For convenience, the operation of one pawl only will be described having reference to the series of pins 18b which are engaged by the cam 37 of a pawl 20 in sequence beginning with the plate nearest fixed head 13 and for the separation of the series of plates again beginning with the plate nearest movable head 15.

The operation of a single pawl 20 begins with its approach toward the first pin 18b of the series with the roller weights rolling on the ramp 34a of track 34 to lower the cam 37 initially. As the cam moves under the first pin 18b of the series, the roller weights 40 remain lifted by the cam and the pawl 20 is held in its second position which allows it to pass under all of the pins 18b of the series. Pivoting of the pawl to its first position by the bias of the roller weights 40 is prevented until cam 37 has passed under the last pin 18b of the series, this pin being that of the first plate 18 to be separated from the series.

As the detent 38 moves under the last pin 18b referred to, roller weights 40 pivot the pawl to its first position such that the last pin is seated in the detent 38 and the roller weights 40 have been lowered to the upper track 34. The continued movement of the pawl (with a corresponding pawl which has engaged the other last pin 18b of the series) moves the plate on rails 12 toward head 15.

When the plate 18 referred to has been separated from the plate 19 to which it is attached by chains 19b and to the extent allowed by the cables, the continued movement of pawls 20 moves both plates referred to until pawls 20 have reached the release plate 41 carried by head 15 as shown in FIG. 4.

Referring again to one side of the filter press, the release plate 41 is elongated or otherwise arranged to depress cam 37, release the pin 18b of the first plate, and allow the pawl to pass fully under the release pin without engagement by the detent. When the first two plates 18 and 19 have been opened as described and shown in FIG. 4, the cleaning of the plates may proceed. That is, a spray mechanism, not shown, may be lowered to clean the exposed faces of the plates, which includes the exposed face of the third plate 18 which will be moved next. Also, the filter cloths may be vibrated.

The movement of the third and fourth plates to the open positions shown in FIG. 5 is initiated in the same way, that is by engagement of the pins 18b of the third plate. As the plate is moved along rails 12, it will engage the second plate 19 and push the latter until it has engaged the first plate 18. In effect, the latter two plates are reclosed and the next two plates are opened. After cleaning, this procedure is continued until all of the plates have been cleaned and the press is then ready to resume normal operation. At that time, the cylinder or ram 14 moves head 15 and pushes all of the plates on rails 12 to their regular positions and further holds the plates and intermediate filter cloths again in compression.

The geometry of the detent 38 for pins 18a relative to the mentioned three point support provided by wheels 40 and links 21a improves the transport of the plates on the rails. That is, plates 18 and 19 are not and should not be lifted from rails 12 as they are moved on the rails. However, there is a distinct upward force component and a corresponding opposite downward force which is supported by rollers 40 on rails 34.

The support of the upper run of chain 21 by track 34 is shown in detail in FIG. 9.

Track 34 may comprise an inverted channel as shown and is provided with the guide strip 34b on which the rollers of chain 21 may operate. Alternatively, a chain having carrier rollers operating directly on track 34 may be provided, but is not shown.

The support of the lower run of a chain 21 is shown in detail in FIGS. 6-9 and is provided by the two channels 35 which are secured to the undersides of brackets 36. The open sections of the channels face each other and the channels are separated to provide a lower lengthwise opening between the two tracks 35a.

Figure 7:
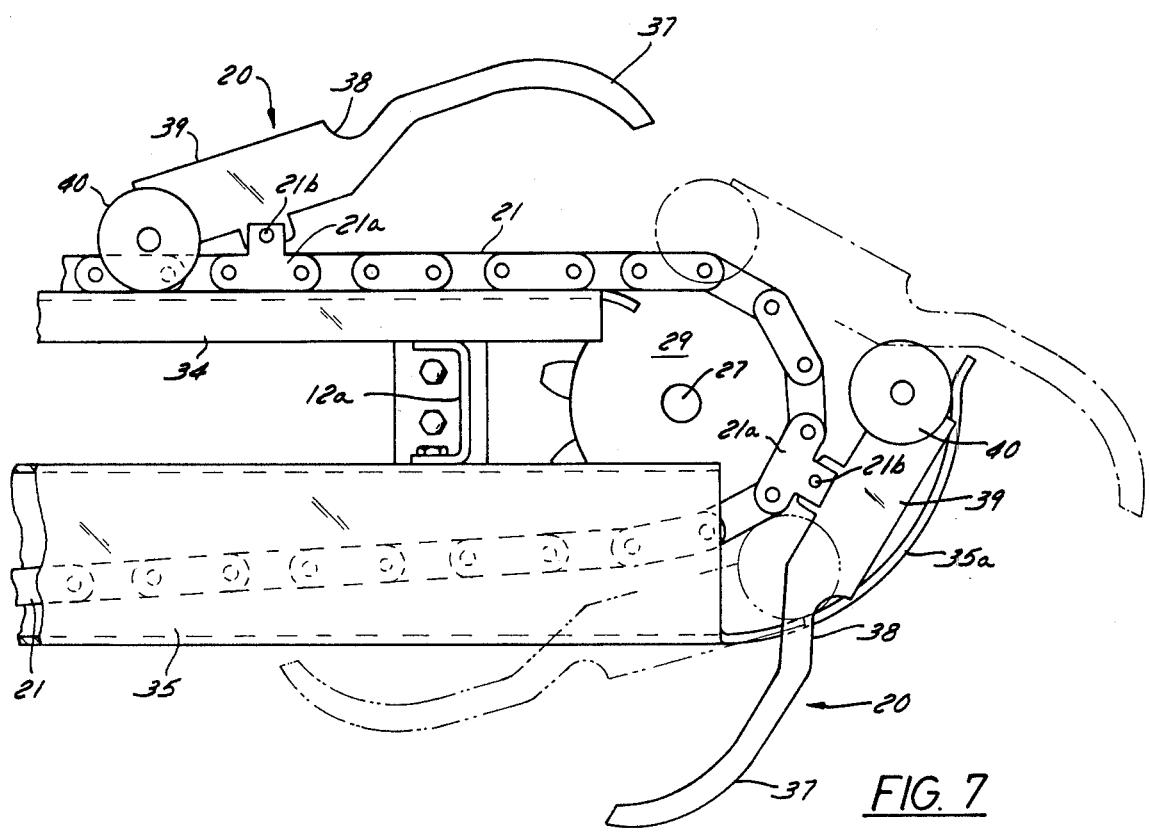
FIG. 7 is an enlarged side elevation of the chain mechanism at the movable head end of the press.

With reference to FIG. 7, as a link 21a moves around sprocket 29 and carries a pawl 20 with it, rollers 40 are shifted relative to pin 21b and fall away from the sprocket and engage the spaced, upwardly curved ends of tracks 35a which are spaced to allow pawl 20 to extend therebetween. As link 21a leaves the underside of sprocket 29, the rollers 40 enter the channels 35 and tracks 35a provide the support of the lower run of the chain. More specifically, the chain rests on the trailing arm 39 of the pawl 20 which is supported by rollers 40 on tracks 35a. With reference to FIG. 4, each chain section between pawls 20 forms a catenary which moves from right to left as shown in FIG. 4. As a given chain section moving toward return sprocket 26 is followed by another such section, the slack in the chain decreases as a function of the added rolling resistances of the following rollers 40.

Figure 6:
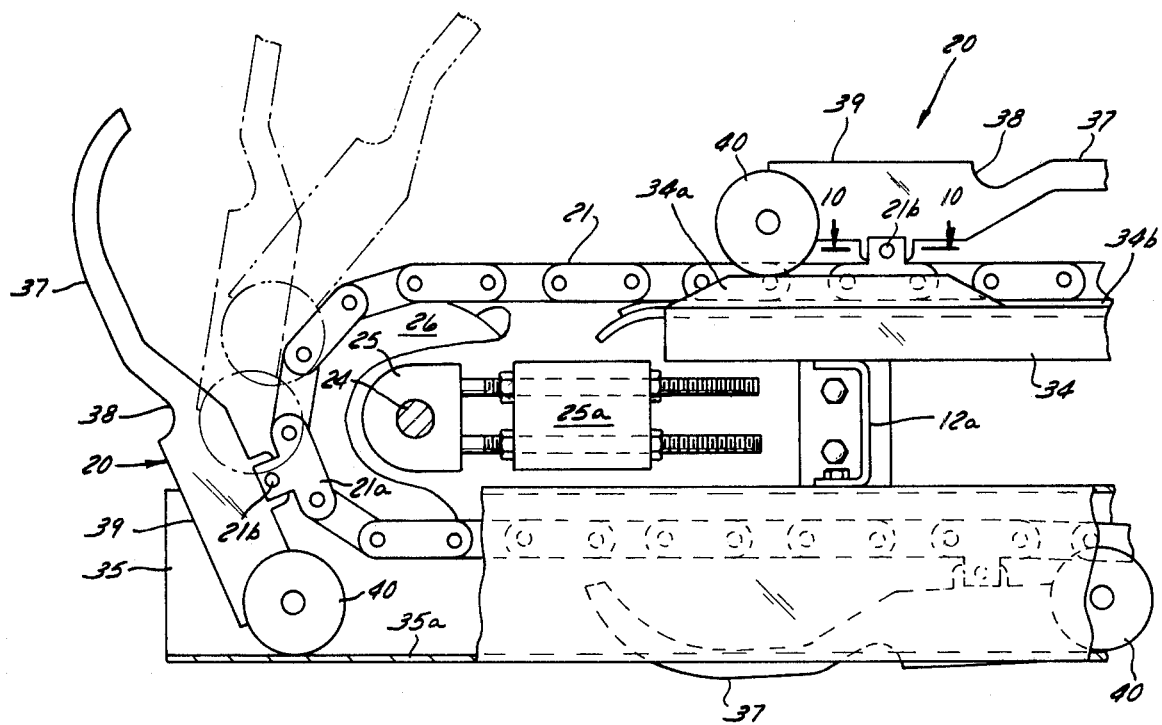
FIG. 6 is an enlarged side elevation of the chain mechanism at the fixed head end of the press.

As the chain section moves onto sprocket 26, the tension may be such that the chain partially supports the pawl 20, also as in FIG. 6 and the roller weights 40 merely ride on the tracks 35a. The series of catenaries serve to maintain the entire chain in tension and thus reduce the need of constant adjustment of the take-ups 25a.

As link 21a moves upwardly around sprocket 26, the rollers 40 are smoothly lifted from channels 35 and the pawl is carried around and moves onto track 34.

The "smooth" movement of pawls 20 is thus provided for and both sprockets may be of a minimum number of teeth. The series of catenaries rather than a single long or short catenary provides a more consistent tension in the chain for improved operation and wear life of both the chain and the sprockets.

The usual interval between pawls 20 is illustrated in FIG. 4 where a pawl has moved a plate 18 to the right and the succeeding pawl is in position to push the next plate 18. This interval reduces unnecessary chain travel to a minimum. For the purposes of the present invention in providing the lower run with at least several catenaries, at least three pawls are required for each chain.

I claim:

1. In a filter plate press having a normally closed series of rail supported plates, means for separating a given number of said plates successively from the series to allow for cleaning their exposed sides including the exposed side of the end plate of the remaining series, comprising a pair of pins oppositely projecting from the first plate of each of said number, the corresponding pins of each pair being disposed in a series, a track below each such series of pins, parallel endless chains having a common drive means, each chain having upper and lower runs, the upper runs being supported on said tracks, pawls having pivotal attachments to said chains at corresponding intervals for the coordinated movement of each two pawls in one direction along said tracks and their return below said tracks, each pawl having a trailing arm and a rear weight in the form of a pair of rotatable wheels, an upper detent forwardly of the pivotal attachment and a cam extending forwardly of the detent, the effective length of the cam being greater than the spacing of the pins of the plates in the described series such that each two pins engaging the cam hold the detent in a lower disengaged position respecting the pins and the wheels in an elevated position respecting the track, the weight of said wheels being effective to pivot the pawl and lift the detent into engagement with the pin of the end plate of the series as the cam passes beyond said last named pin such that the two pins of the end plate of the series are engaged by two pawl detents and the wheels are supported by the tracks, the roller weights being disposed relative to the respective detents and the pivotal attachments of the pawls to the chains being such that the wheels partially support the plate being moved by the pawls and spaced parallel track means supporting the wheels of the pawls of the lower run of the chain, said track means being spaced so that the pawls may depend therebetween and the slack in the lower run may be in the form of a catenary between each two pawls and hang between said spaced track means.

2. In the filter press of claim 1, said chain being a roller chain and the track including a raised center section on which the rollers of the chain are supported.

3. In the filter press of claim 2, the rollers of each attachment link and the wheels of the pawl being spaced to provide the firm support of the pawl for directly approaching each pin.

4. In the filter press of claim 1, the parallel track means being curved upwardly at each end to receive and guide the wheels as the attachment link moves downwardly with the drive sprocket and to support the wheels as the attachment link moves upwardly with the drive sprocket.

5. In a filter press including a front head, a pair of spaced, parallel support rails extending from said front head, a movable head between and carried by said support rails, a series of filter plates intermediate said heads and disposed between and movable on said support rails, power means disposed to move said movable head selectively toward said front head to compress said plates therebetween and away from said front head to provide an opening between the movable head and the first plate adjacent thereto, and plate shifting means for moving said plates to provide openings successively between the plates of the series for access and cleaning purposes, said plate shifting means on each side of the press including (a) an upper chain track and lower laterally spaced wheel tracks,
(b) drive and driven sprockets at the opposite ends of said tracks,
(c) an endless link chain operating over said sprockets and having an upper run toward the movable head supported on said upper track,
(d) a pawl having a pivotal connection to a link of said chain for movement therewith in an operative position over said track and in an inverted position under said track,
(e) a pair of wheels of a weight which biases the pawl upwardly, and
(f) means supporting said wheels tracks whereby the return run of the chain is supported at intervals by the pawls which are in turn supported by said wheels operating on said track.

6. In a filter press including a series of filter plates in a horizontal series and having laterally projecting pins for engagement respectively by means which are to separate said plates successively for their cleaning, each such means comprising an endless chain having upper and lower runs, a number of pawls pivotally attached to the chain at regular intervals and having a detent for engaging a pin, a track supporting the upper run of the chain, each pawl having a trailing arm intermediate spaced roller weights for riding on said track and a forward cam to control the pawl so as to engage only the last pin of selected plates, and spaced lower tracks for the direct support of the roller weights of each inverted pawl, said tracks being spaced to allow the lower run of the chain to hang therebetween.

7. In the filter press of claim 6, each chain having at least three pawls so that the lower run of the chain forms at least two catenaries.

* * * * *